US012165612B2

(12) United States Patent
Jun et al.

(10) Patent No.: US 12,165,612 B2
(45) Date of Patent: Dec. 10, 2024

(54) DISPLAY PROCESSING APPARATUS AND METHOD FOR PROCESSING IMAGE DATA

(71) Applicant: LX Semicon Co., Ltd., Daejeon (KR)

(72) Inventors: Young Jun Jun, Daejeon (KR); Young Seo Yoon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/950,706

(22) Filed: Sep. 22, 2022

(65) Prior Publication Data

US 2023/0138364 A1 May 4, 2023

(30) Foreign Application Priority Data

Oct. 28, 2021 (KR) ........................ 10-2021-0145313

(51) Int. Cl.
*G09G 5/10* (2006.01)
*G09G 3/20* (2006.01)

(52) U.S. Cl.
CPC ............. *G09G 5/10* (2013.01); *G09G 3/2092* (2013.01); *G09G 2320/0673* (2013.01); *G09G 2330/021* (2013.01); *G09G 2360/16* (2013.01)

(58) Field of Classification Search
CPC ....... G09G 2360/16; G09G 2320/0271; G09G 2320/0673
See application file for complete search history.

(56) References Cited

U.S. PATENT DOCUMENTS

| | | | | |
|---|---|---|---|---|
| 7,973,973 B2 * | 7/2011 | Nose | G09G 3/2007 | 358/1.9 |
| 8,040,337 B2 * | 10/2011 | Nose | G09G 3/3648 | 345/207 |
| 9,311,861 B2 * | 4/2016 | Nose | G09G 3/3406 | |
| 11,030,957 B2 * | 6/2021 | Kim | H10K 59/131 | |
| 11,488,563 B2 * | 11/2022 | Jun | G09G 3/20 | |
| 11,600,215 B2 * | 3/2023 | Lin | G09G 3/2007 | |
| 11,972,723 B2 * | 4/2024 | Foo | G09G 3/3208 | |
| 2005/0057485 A1 * | 3/2005 | Diefenbaugh | G09G 3/3406 | 345/102 |
| 2006/0268299 A1 * | 11/2006 | Nose | G09G 3/3648 | 358/1.9 |
| 2007/0268524 A1 * | 11/2007 | Nose | G09G 3/2092 | 358/1.9 |

(Continued)

FOREIGN PATENT DOCUMENTS

| | | |
|---|---|---|
| JP | 4198720 B2 | 12/2008 |
| JP | 5013581 B2 | 8/2012 |

(Continued)

OTHER PUBLICATIONS

Notice of Allowance dated Jul. 13, 2022 in U.S. Appl. No. 17/190,935.
Office Action dated Mar. 9, 2022 in U.S. Appl. No. 17/190,935.

*Primary Examiner* — Patrick F Marinelli
(74) *Attorney, Agent, or Firm* — ROTHWELL, FIGG, ERNST & MANBECK, P.C.

(57) ABSTRACT

The present embodiment relates to an apparatus and method for processing image data for driving a display panel, and more particularly, to an apparatus and method for flexibly changing brightness of each pixel based on a representative brightness value of each image.

16 Claims, 13 Drawing Sheets

(56) References Cited

U.S. PATENT DOCUMENTS

| | | | | |
|---|---|---|---|---|
| 2009/0284545 | A1* | 11/2009 | Watanabe | G09G 3/3406 345/589 |
| 2014/0085320 | A1* | 3/2014 | Holland | G06F 13/1663 711/147 |
| 2014/0160176 | A1* | 6/2014 | Nose | G09G 3/3685 345/102 |
| 2014/0320546 | A1 | 10/2014 | Im et al. | |
| 2015/0206331 | A1* | 7/2015 | Nose | G06T 5/92 345/617 |
| 2015/0228215 | A1* | 8/2015 | Nose | G09G 3/2092 382/167 |
| 2015/0302789 | A1* | 10/2015 | Furihata | G09G 3/2007 345/694 |
| 2016/0035293 | A1* | 2/2016 | Furihata | G09G 5/02 345/694 |
| 2016/0104408 | A1* | 4/2016 | Kim | G09G 3/36 345/690 |
| 2017/0162127 | A1* | 6/2017 | Park | G09G 3/3233 |
| 2018/0158214 | A1* | 6/2018 | Nose | G09G 3/2092 |
| 2020/0082761 | A1* | 3/2020 | Kim | G09G 3/3233 |
| 2021/0247720 | A1* | 8/2021 | Catthoor | G09G 3/003 |
| 2021/0312884 | A1* | 10/2021 | Jun | G09G 3/20 |
| 2022/0101798 | A1* | 3/2022 | Jung | G09G 3/3275 |
| 2023/0073431 | A1* | 3/2023 | Peng | G09G 3/3258 |
| 2023/0138364 | A1* | 5/2023 | Jun | G09G 3/2092 345/690 |

FOREIGN PATENT DOCUMENTS

| | | | |
|---|---|---|---|
| KR | 2014-0008036 | A | 1/2014 |
| KR | 10-1840796 | B1 | 3/2018 |
| KR | 101969830 | B1 | 8/2019 |

* cited by examiner

FIG. 5

| | Point1 | Point2 | Point3 | Point4 | Point5 | Point6 | Point7 | Point8 |
|---|---|---|---|---|---|---|---|---|
| Set | 7 | 7 | 7 | 6 | 6 | 6 | 5 | 5 |

FIG. 6

| | |
|---|---|
| Point8 value | $1023 - 2^{Point8}$ |
| Point7 value | Point8 value $- 2^{Point7}$ |
| Point6 value | Point7 value $- 2^{Point6}$ |
| Point5 value | Point6 value $- 2^{Point5}$ |
| Point4 value | Point5 value $- 2^{Point4}$ |
| Point3 value | Point4 value $- 2^{Point3}$ |
| Point2 value | Point3 value $- 2^{Point2}$ |
| Point1 value | Point2 value $- 2^{Point1}$ |

*FIG. 7*

| | |
|---|---|
| Point8 value | 991 (1023 – $2^5$) |
| Point7 value | 959 (Point8 value – $2^5$) |
| Point6 value | 895 (Point7 value – $2^6$) |
| Point5 value | 831 (Point6 value – $2^6$) |
| Point4 value | 767 (Point5 value – $2^6$) |
| Point3 value | 639 (Point4 value – $2^7$) |
| Point2 value | 511 (Point3 value – $2^7$) |
| Point1 value | 383 (Point2 value – $2^7$) |

*FIG. 8*

| WAPL \ APL | 1~5 | 6~10 | 11~15 | 16~20 | 21~25 |
|---|---|---|---|---|---|
| 1~5 | Lv1 | Lv2 | Lv3 | Lv4 | Lv5 |
| 6~10 | Lv21 | Lv22 | Lv33 | Lv24 | Lv25 |
| 11~15 | Lv41 | Lv42 | Lv43 | Lv44 | Lv45 |
| 16~20 | Lv61 | Lv62 | Lv63 | Lv64 | Lv65 |
| 21~25 | Lv81 | Lv82 | Lv83 | Lv84 | Lv85 |

DISPLAY PROCESSING APPARATUS AND METHOD FOR PROCESSING IMAGE DATA

CROSS REFERENCE TO RELATED APPLICATION

This application claims priority to Korean Patent Application No. 10-2021-0145313 filed on Oct. 28, 2021, which is hereby incorporated by reference for all purposes as if fully set forth herein.

BACKGROUND

1. Field of Technology

The present embodiment relates to a display processing apparatus and method for processing image data for driving a display panel.

2. Related Technology

As the information society is advanced, a need for a display device for displaying an image is increased in various forms. Recently, several display devices, such as a liquid crystal display device (LCD), a plasma display panel (PDP), and an organic light emitting display device (OLED), are used.

The display device displays an image on a panel by controlling brightness of each pixel based on image data that is received from a host device. In general, a self-emitting display device (e.g., an organic light-emitting display device) in which a pixel autonomously emits light without using a backlight may control brightness of each pixel by controlling the size of a driving current that is supplied to the pixel.

In the display device, the size of a driving current supplied to a pixel is controlled by an analog voltage (so-called a data voltage) converted from image data. As a result, the display device may control brightness of each pixel based on the image data.

In this case, as the brightness of each pixel is increased, the amount of power consumed of the display device is increased.

In other words, as more white-series colors are distributed in an image scene included in image data, the brightness of each pixel is increased. Accordingly, the amount of power consumed of the display device is increased, and a glare phenomenon for a user who uses the display device also occurs.

In order to solve the problem, in a conventional display device, the amount of power consumed is reduced and a glare phenomenon for a user is also prevented by uniformly reducing brightness of image data.

However, if the brightness of image data is uniformly lowered, brightness of an image scene, in which the brightness is unwanted to be reduced, is also reduced and thus there is a problem in that picture quality may be degraded.

For example, although many dark colors are distributed in an image scene, conventionally, there is a problem in that picture quality of the image scene in which the dark colors are distributed may be degraded because the display device has uniformly reduced the brightness of image data.

Furthermore, although many dark colors are distributed in an image scene, if brightness of image data is reduced, there is a problem in that the image scene is displayed with brightness unwanted by a user.

The discussions in this section are only to provide background information and does not constitute an admission of prior art.

SUMMARY

In this background, in an aspect, an object of the present embodiment is to provide a technology for flexibly changing brightness of each pixel based on a representative brightness value of an image scene.

Furthermore, in an aspect, an object of the present embodiment is to provide a technology for flexibly changing brightness of each pixel when a representative brightness value of an image scene is greater than a set threshold value.

An embodiment provides a display processing apparatus, including a memory circuit configured to store a threshold value related to the adjustment of brightness of a pixel, a representative brightness value calculation circuit configured to calculate a representative brightness value for input brightness values for each pixel, which are included in image data, and an image data conversion circuit configured to convert the input brightness values for each pixel into output brightness values for each pixel based on information corresponding to a reference curve for brightness adjustment when the representative brightness value is greater than a first threshold value stored in the memory circuit.

A method of processing, by a display processing apparatus, image data, includes receiving threshold values related to the adjustment of brightness of a pixel, calculating a representative brightness value for input brightness values for each pixel, which are included in image data, and converting the input brightness values for each pixel into output brightness values for each pixel based on information corresponding to a reference curve for brightness adjustment when the representative brightness value is greater than a first threshold value among the threshold values.

As described above, according to the present embodiment, the display processing apparatus generates a curve for brightness adjustment by properly adjusting the curve based on a representative brightness value of an image scene, and adjusts brightness of each pixel corresponding to the image scene through the curve for brightness adjustment. Accordingly, a phenomenon in which picture quality is degraded, which occurs due to uniform brightness adjustment conventionally, can be solved.

Furthermore, a circuit that constitutes the display processing apparatus can be simplified because the display processing apparatus generates a curve for brightness adjustment through a simple operation.

Furthermore, the display processing apparatus flexibly changes brightness of each pixel only when a representative brightness value of an image scene is greater than a set threshold value. Accordingly, if an adaptive current limit (ACL) is applied, although many dark colors are distributed, brightness of image data can be prevented from being reduced.

BRIEF DESCRIPTION OF THE DRAWINGS

FIG. 5 is a diagram exemplifying set values according to an embodiment.

FIGS. 6 and 7 are diagrams for describing a construction for calculating an X axis point value according to an embodiment.

FIG. 8 is a diagram exemplifying a lookup table according to an embodiment.

DETAILED DESCRIPTION OF EMBODIMENTS

Figure 1:
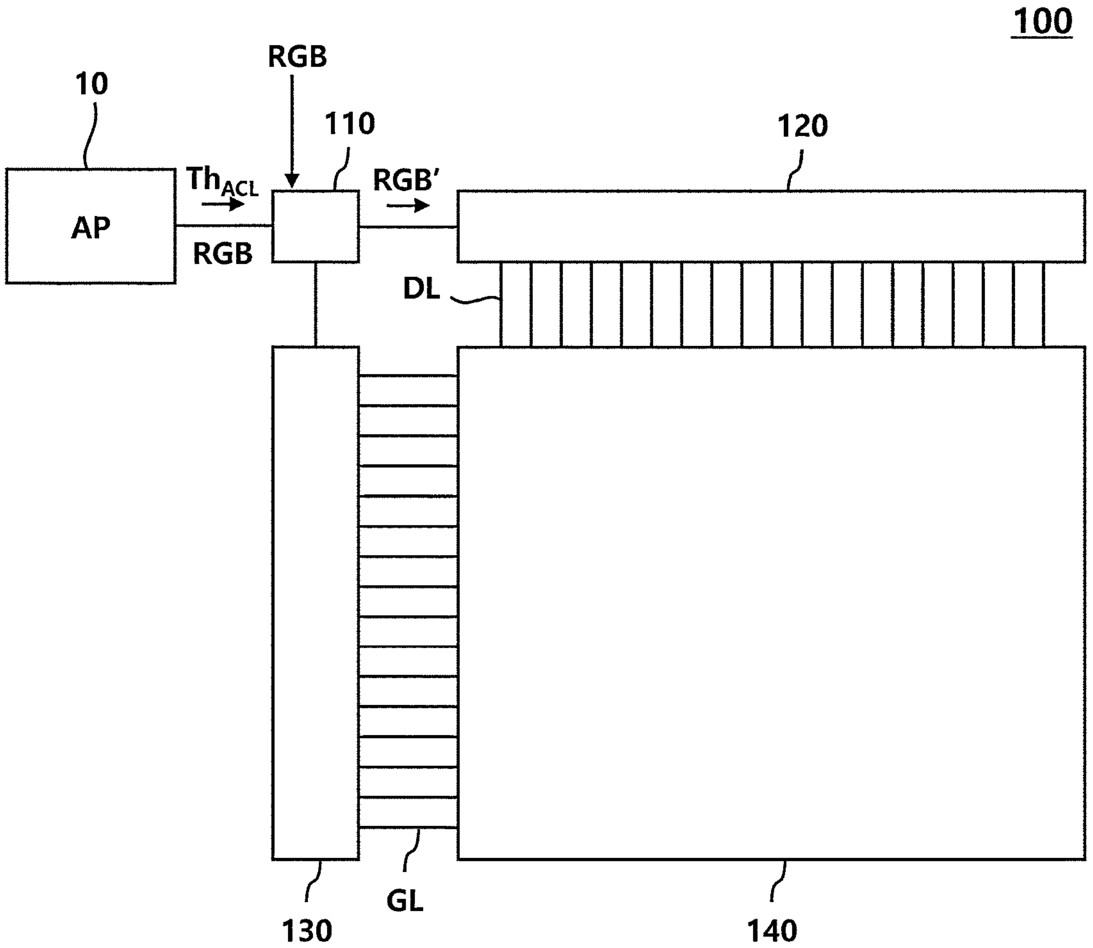
FIG. 1 is a construction diagram of a display device according to an embodiment.

FIG. 1 is a construction diagram of a display device according to an embodiment.

Referring to FIG. 1, the display device 100 may include an image data processing apparatus 110, a panel driving device 120, a gate driving device 130, a display panel 140, etc. The image data processing apparatus 110 may be denoted as a display processor (or a display processing apparatus). The display processor may be used as a concept that further includes the panel driving device 120 and/or the gate driving device 130 in addition to the image data processing apparatus 110. The display processor may include one display driving device IC (DDI), but the present disclosure is not limited thereto.

The image data processing apparatus 110 may receive input image data RGB from the outside (e.g., an application processor (AP) 10 or another host device), and may convert the input image data RGB into output image data RGB', and may transmit the output image data RGB' to the panel driving device 120.

The panel driving device 120 may receive the output image data RGB' from the image data processing apparatus 110, and may generate an analog voltage (e.g., a data voltage) by using the output image data RGB'.

Furthermore, the panel driving device 120 may supply the analog voltage to each pixel disposed in the display panel 140 through a data line DL.

In this case, each pixel, that is, multiple pixels, may be disposed in the display panel 140. Each of the multiple pixels may be a pixel that autonomously emits light. For example, each pixel may include an organic light emitting diode (OLED), and may autonomously emit light by a driving current that is supplied to the OLED. In this case, brightness of each pixel may be controlled by the analog voltage supplied by the panel driving device 120.

The gate driving device 130 may supply the display panel 140 with a scan signal through a gate line GL.

A specific line of the display panel 140 may be selected in response to the scan signal. The analog voltage supplied by the panel driving device 120 may be supplied to only a pixel of the selected line.

The image data processing apparatus 110 may control timing at which the scan signal is supplied and timing at which the analog voltage is supplied by supplying the panel driving device 120 and the gate driving device 130 with a synchronization signal and/or a control signal.

The image data processing apparatus 110 may be called a timing controller, the panel driving device 120 may be called a source driving device or a column driving device, and the gate driving device 130 may be called a gate driving device. Furthermore, each of the apparatuses may be constructed in the form of an independent integrated circuit or two or more of the apparatuses may be constructed as one integrated circuit (e.g., a DDI).

In an embodiment, the image data processing apparatus 110 may analyze brightness of a scene image corresponding to the input image data RGB that is received from the outside (e.g., the AP 10 or another host device), may adjust an input brightness values for each pixel, of the input image data RGB, based on the brightness of the scene image, and may transmit, to the panel driving device 120, the output image data RGB' including an output brightness value for each pixel, that is, the adjusted input brightness values for each pixel.

To this end, the image data processing apparatus 110 may apply an adaptive current limit or automotive current limit (ACL) technology. The image data processing apparatus 110 may receive, from the AP 10, at least one threshold value ($Th_{ACL}$) related to the adjustment of brightness of a pixel. In an embodiment, the image data processing apparatus 110 may perform processing so that the ACL is applied to input image data when a representative brightness value for input brightness values for each pixel included in the input image data is greater than a first threshold value ($Th_L$) among the at least one threshold value ($Th_{ACL}$) received from the AP 10. For example, when the representative brightness value is greater than the first threshold value ($Th_L$) of the at least one threshold value ($Th_{ACL}$) received from the AP 10, the image data processing apparatus 110 may convert an input brightness values for each pixel into an output brightness value for each pixel based on a set reference curve for brightness adjustment. In contrast, when the representative brightness value is not greater than the first threshold value ($Th_L$) of the at least one threshold value ($Th_{ACL}$) received from the AP 10, the image data processing apparatus 110 may set an input brightness values for each pixel as an output brightness value for each pixel without any change.

In another embodiment, when the representative brightness value is greater than a second threshold value ($Th_H$) among the at least one threshold value ($Th_{ACL}$) received from the AP 10, the image data processing apparatus 110 may set an input brightness values for each pixel as an output brightness value for each pixel based on a maximum reference curve for brightness adjustment.

Hereinafter, various embodiments in which the image data processing apparatus 110 applies the ACL based on a representative brightness value are described with reference to FIGS. 2 to 14.

Figure 2:
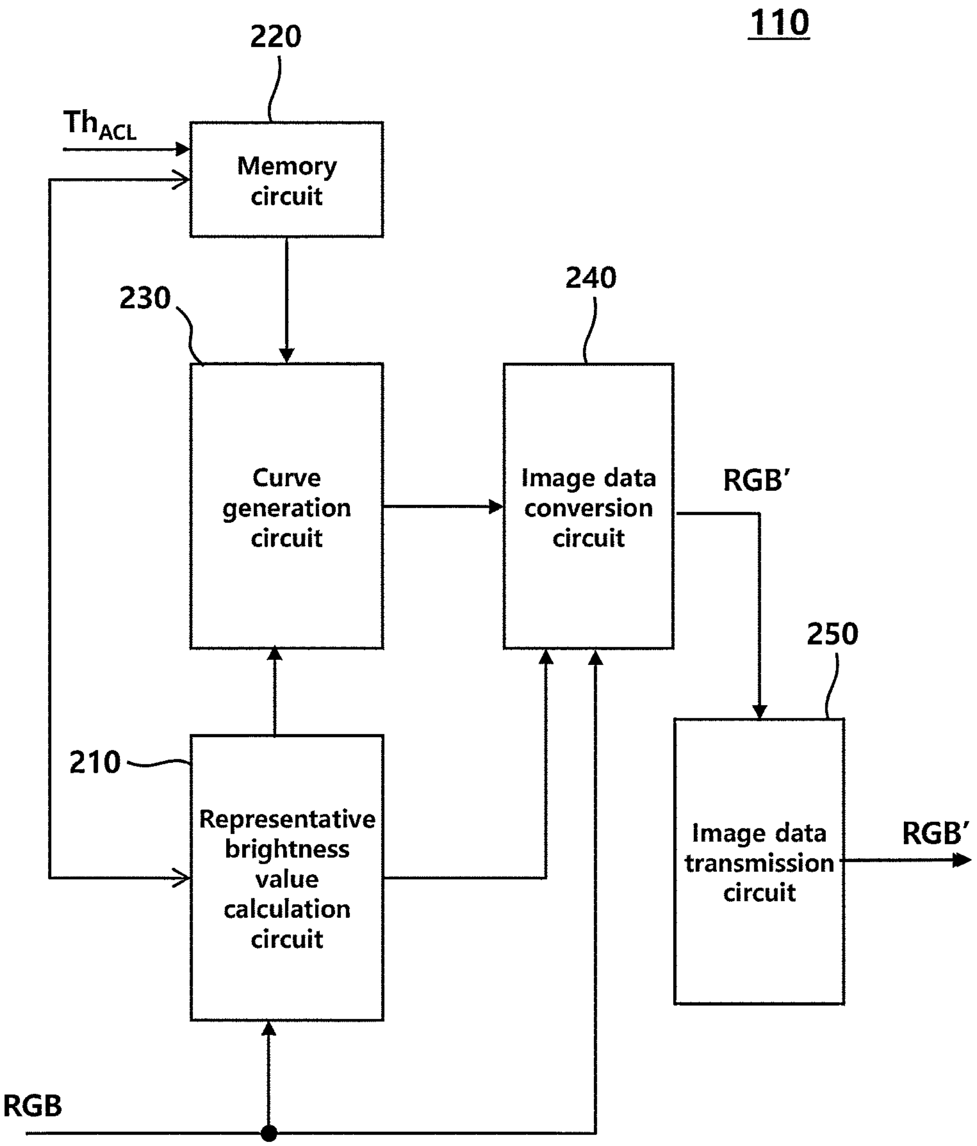
FIG. 2 is a construction diagram of an image data processing apparatus according to an embodiment.

FIG. 2 is a construction diagram of the image data processing apparatus 110 according to an embodiment.

Referring to FIG. 2, the image data processing apparatus 110 may include a representative brightness value calculation circuit 210, a memory circuit 220, a curve generation circuit 230, an image data conversion circuit 240, and an image data transmission circuit 250.

The image data processing apparatus 110 may receive, from the AP 10, the at least one threshold value ($Th_{ACL}$) (e.g., the first threshold value ($Th_L$) and/or the second threshold value ($Th_H$)) related to the adjustment of brightness of a pixel, and may store the at least one threshold value ($Th_{ACL}$) in the memory circuit 220. In an embodiment, the at least one threshold value ($Th_{ACL}$) related to the adjustment of brightness of a pixel may be received from the AP 10 through communication using a mobile industry process interface (MIPI) (e.g., an MIPI-display serial interface (DSI)). According to various embodiments, the at least one threshold value related to the adjustment of brightness of a pixel may be stored in accordance with each address that is assigned to the AP 10 as in Table 1.

TABLE 1

| Address | Name | R (read)/ W (write) | Value | Description |
|---|---|---|---|---|
| 0X0010 | $Th_L$ | R/W | 0100000000 | First threshold value (ACL application lower bound) |
| 0X0020 | $Th_H$ | R/W | 0111000000 | Second threshold value (ACL application upper bound) |

The representative brightness value calculation circuit 210 may calculate a representative brightness value for input brightness values for each pixel, which are included in the input image data RGB. In this case, the representative brightness value may be called an average picture level (APL), and may be calculated by Equation 1 and Equation 2. The input brightness values for each pixel may include a red (R) grayscale value that is a grayscale value of an R subpixel of each pixel, a green (G) grayscale value that is a grayscale value of a G subpixel of each pixel, and a blue (B) grayscale value that is a grayscale value of a B subpixel of each pixel.

$$Y = a \times R \text{ grayscale value} + b \times G \text{ grayscale value} + c \times B \text{ grayscale value} \quad \text{[Equation 1]}$$

$$APL = \text{avg}(Y_1 \mid Y_N) = \frac{Y_1 + Y_2 + \ldots + Y_n}{n} \quad \text{[Equation 2]}$$

In this case, Y may be a pixel grayscale value that is a luminance component for each of multiple pixels disposed in the display panel 140. The R grayscale value may be a grayscale value of the R subpixel constituting each pixel. The G grayscale value may be a grayscale value of the G subpixel constituting each pixel. The B grayscale value may be a grayscale value of the B subpixel constituting each pixel. "n" may be the number of multiple pixels. Furthermore, "a" may be a weight of the R grayscale value. "b" may be the weight of the G grayscale value. "c" may be the weight of the B grayscale value. a, b, and c may have a relation "a+b+c=1."

The representative brightness value calculation circuit 210 may also calculate a weighted average brightness value for input brightness values for each pixel.

Specifically, the representative brightness value calculation circuit 210 may calculate a weighted average brightness value for input brightness values for each pixel by dividing a maximum value, among a first square sum value of square numbers of R grayscale values for each pixel, a second square sum value of square numbers of G grayscale values for each pixel, and a third square sum value of square numbers of B grayscale values for each pixel, by a maximum value among a first sum value of the R grayscale values, a second sum value of the G grayscale values, and a third sum value of the B grayscale values.

In this case, the weighted average brightness value may also be called a weighted average picture level (WAPL).

In an embodiment, the representative brightness value calculation circuit 210 may compare the APL or the WAPL with the at least one threshold value ($Th_{ACL}$) (e.g., the first threshold value ($Th_L$) and/or the second threshold value ($Th_H$)) that is stored in the memory circuit 220 and that is related to the adjustment of brightness of a pixel.

Figure 3:
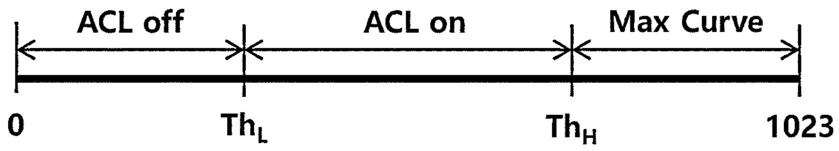
FIG. 3 is a diagram illustrating an ACL application range according to an embodiment.

FIG. 3 is a diagram illustrating an ACL application range according to an embodiment. Referring to FIG. 3, when the APL or the WAPL is smaller than the first threshold value ($Th_L$) as a result of the comparison, this corresponds to a case where a corresponding image is relatively dark. The ACL may be applied in the image data conversion circuit 240 (ACL off). For example, when the APL or the WAPL is smaller than the first threshold value, the image data conversion circuit 240 may output the input brightness value for each pixel as an output brightness value for each pixel without any change, without adjusting the input brightness value for each pixel.

In an embodiment, when the APL or the WAPL is greater than the first threshold value as a result of the comparison, the image data conversion circuit 240 may perform control (ACL on) so that brightness of an image is adjusted by applying the ACL. An example in which the ACL is applied is described in detail with reference to FIG. 4 and the drawings subsequent thereto.

According to various embodiments, when the APL or the WAPL is greater than the second threshold value ($Th_H$) as a result of the comparison, this corresponds to a case where an image has set brightness or more. The image data conversion circuit 240 may perform control so that the ACL is applied based on a maximum reference curve (Max Curve) for brightness adjustment. In an embodiment, although the ACL is applied based on the maximum reference curve (Max Curve) for brightness adjustment, the ACL may be considered as being applied (ACL on).

According to various embodiments, when the APL or the WAPL is greater than the first threshold value ($Th_L$) or when the APL or the WAPL is greater than the first threshold value ($Th_L$) and smaller than the second threshold value ($Th_H$), in order to apply the ACL to the input image data, the curve generation circuit 230 may generate a curve for brightness adjustment. In an embodiment, the memory circuit 220 may store data for generating, by the curve generation circuit 230, the curve for brightness adjustment.

Specifically, the memory circuit 220 may store N set values, N first Y axis point values, and N second Y axis point values for generating the curve for brightness adjustment. In this case, an X axis coordinate value of the curve for brightness adjustment may be an input brightness value, and a Y axis coordinate value may be an output brightness value.

In an embodiment, in order to minimize the size of the memory circuit 220, the memory circuit 220 does not store all of X and Y coordinate values of points that constitute the curve for brightness adjustment, and may store N set values, N first Y axis point values, and N second Y axis point values, that is, data that is basically necessary for the curve generation circuit 230 to generate the curve for brightness adjustment.

In this case, the N set values may mean data for calculating N X axis point values that are necessary for the curve generation circuit 230 to generate the curve for brightness adjustment.

The set values may include an exponent of power of two as in FIGS. 5 and 6. The reason why the N set values include an exponent of power of two is described in detail when the curve generation circuit 230 is described.

If the representative brightness value calculation circuit 210 calculates a weighted average brightness value for input brightness values for each pixel, as in FIG. 7, the memory circuit 220 may further store a lookup table that includes multiple weighted average brightness ranges and multiple representative brightness grades according to multiple representative brightness ranges versus the multiple weighted average brightness ranges.

The curve generation circuit 230 may generate a curve for brightness adjustment for properly adjusting an input brightness value for each pixel of input image data.

Specifically, the curve generation circuit 230 may calculate N X axis point values by using N set values.

In an embodiment, the curve generation circuit 230 may calculate first to N-th power values, that is, power values of 2 using the N set values as an exponent, through a shift operation.

For example, if the N set values include a point 1 set value to a point 8 set value, that is, eight set values, and a point 8 set value is 5 as in FIG. 5 the curve generation circuit 230 may calculate a binary number "00010000" corresponding to 32, that is, a five-power value of two, by shifting a binary number "00000001" to the left by 5.

As described above, after calculating the first to N-th power values, the curve generation circuit 230 may preferentially calculate an N-th X axis point value by subtracting the N-th power value from the highest brightness value of a preset pixel as in FIG. 6.

Thereafter, the curve generation circuit 230 may second calculate an (N−1)-th X axis point value by subtracting an (N−1)-th power value from the N-th X axis point value.

Likewise, the curve generation circuit 230 may calculate an (N−2)-th X axis point value to the first X axis point value.

In other words, when calculating the N X axis point values, the curve generation circuit 230 may calculate the N X axis point values in order from a point value having the greatest brightness value to a point value having the smallest brightness value.

For example, if the N set values are the same as those in FIG. 5, the curve generation circuit 230 may preferentially calculate "991", that is, an eighth X axis point value having the greatest brightness value, and may then calculate the remaining X axis point values in order of brightness values as in FIG. 6.

In an embodiment, a circuit that constitutes the curve generation circuit 230 can be simplified because the curve generation circuit 230 calculates the X axis point values through the shift operation and the subtraction operation as described above.

The curve generation circuit 230 may match (refer to square points in FIG. 9) the N X axis point values calculated as described above and the N first Y axis point values (Min1 to Min8 in FIG. 9) stored in the memory circuit 220.

Figure 9:
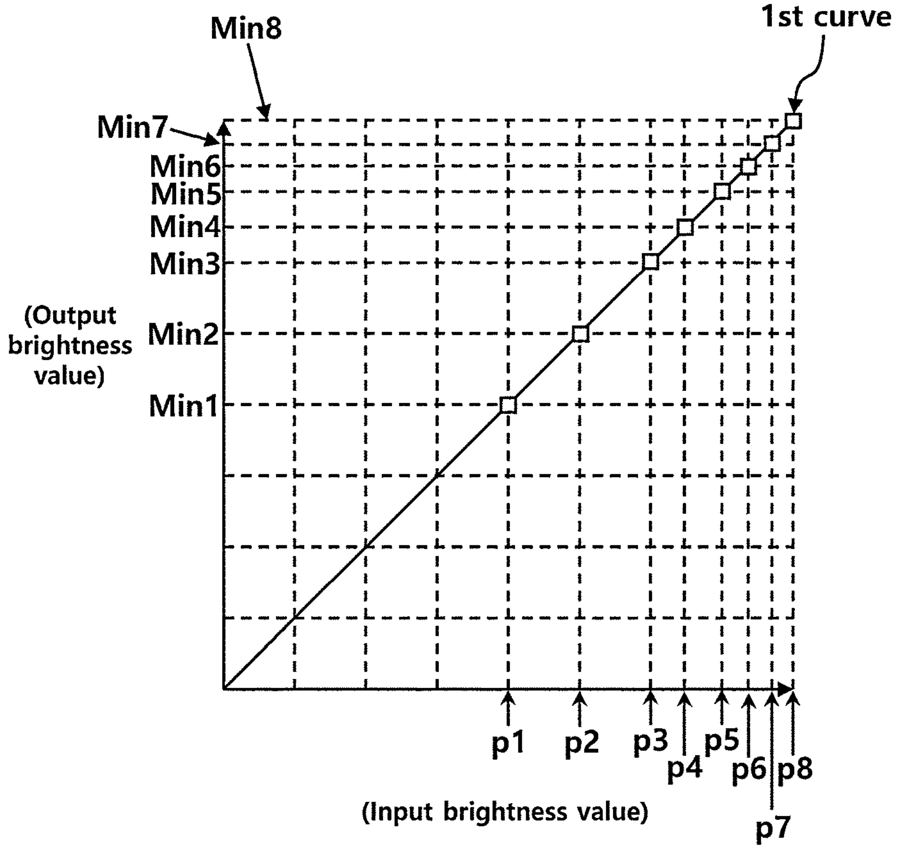
FIG. 9 is a diagram for describing a construction for generating a first reference curve according to an embodiment.

Thereafter, the curve generation circuit 230 may generate a first reference curve, such as that in FIG. 9, through a data interpolation method by calculating values that connect the N X axis point values.

Furthermore, the curve generation circuit 230 may match (refer to diamond points in FIG. 10) the N X axis point values and the N second Y axis point values (Max1 to Max8 in FIG. 10) stored in the memory circuit 220.

Figure 10:
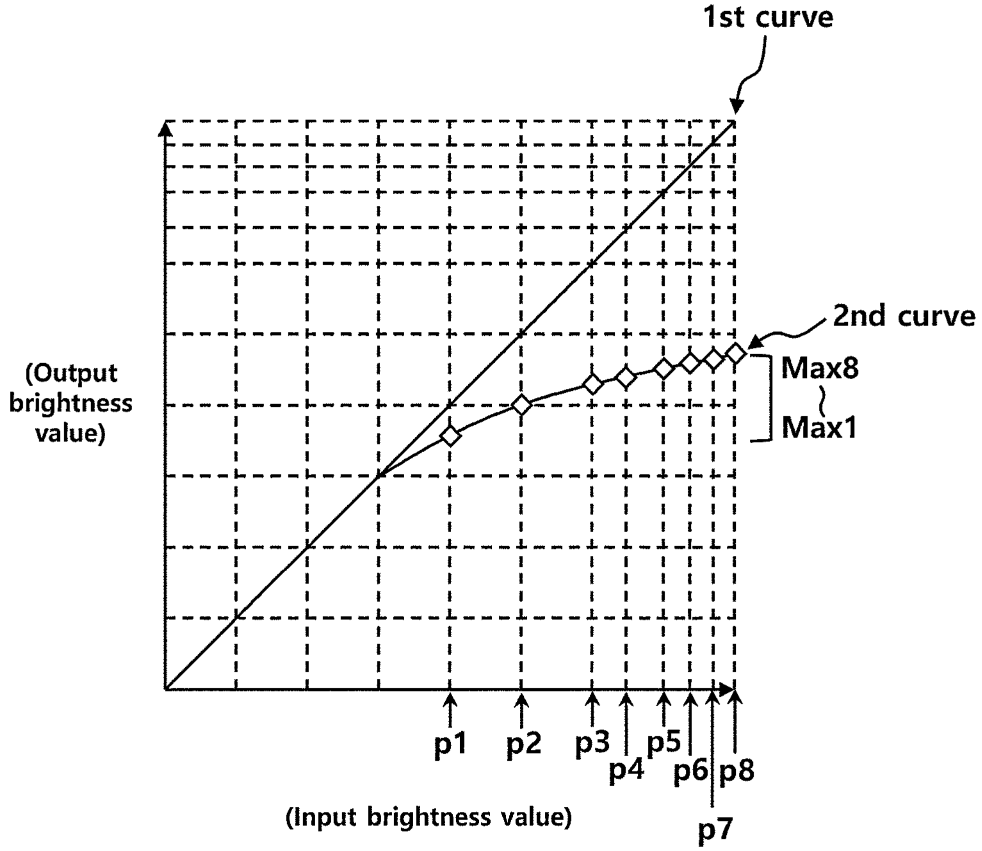
FIG. 10 is a diagram for describing a construction for generating a second reference curve according to an embodiment.

Thereafter, the curve generation circuit 230 may generate a second reference curve, such as that in FIG. 10, by calculating values that connect the N X axis point values through a data interpolation method.

In this case, the first reference curve and the second reference curve may be a minimum adjustment criterion and a maximum adjustment criterion, respectively, which are necessary to generate curves for brightness adjustment in which a representative brightness value has been incorporated.

The curve generation circuit 230 that has generated the first reference curve and the second reference curve as described above may generate a curve for brightness adjustment through a data interpolation method using a first representative brightness value designated for the first reference curve, a second representative brightness value designated for the second reference curve, and the representative brightness value. In this case, the first representative brightness value and the second representative brightness value may be stored in the memory circuit 220. The representative brightness value may be smaller than or equal to the first representative brightness value and may be greater than or equal to the second representative brightness value.

In an embodiment, an N-th Y axis point value of a curve for brightness adjustment, which has been matched with an N-th X axis point value, may be calculated by the following interpolation method equation.

$$\frac{[\text{Max. } N \times (Rv.\ B - Rv.\ B_1)] + [\text{Min. } N \times (Rv.\ B_2 - Rv.\ B)]}{(Rv.\ B - Rv.\ B_1) + (Rv.\ B_2 - Rv.\ B)} \quad \text{[Equation 3]}$$

In Equation 3, Max.N may be an N-th second Y axis point value, Rv.B may be a representative brightness value, $Rv.B_1$ may be a first representative brightness value, Min.N may be an N-th first Y axis point value, and $Rv.B_2$ may be a second representative brightness value.

The curve generation circuit 230 may calculate N Y axis point values of a curve for brightness adjustment through the interpolation method equation. Furthermore, the curve generation circuit 230 may generate a curve for brightness adjustment, such as that in FIG. 11, by also calculating values that connect the N X axis point values matched (refer to the origin in FIG. 11) with the N Y axis point values through the data interpolation method.

If the representative brightness value calculation circuit 210 calculates a weighted average brightness value for input brightness values for each pixel and the memory circuit 220 further stores a lookup table, such as that in FIG. 8, the curve generation circuit 230 may extract, from the lookup table, a specific representative brightness grade according to a specific representative brightness range versus a specific weighted average brightness range. In this case, the specific representative brightness range may be a representative brightness range including a representative brightness value. The specific weighted average brightness range may be a weighted average brightness range including a weighted average brightness value.

The curve generation circuit 230 may generate the curve for brightness adjustment by using the first reference curve, the second reference curve, and the specific average brightness grade.

In other words, a first representative brightness grade may be designated in the first reference curve. A second representative brightness grade may be designated in the second reference curve. Furthermore, the curve generation circuit 230 may generate the curve for brightness adjustment through the data interpolation method using the first representative brightness grade, the second representative brightness grade, and the specific average brightness grade.

In an embodiment, as described above, the curve generation circuit 230 may properly adjust the curve for brightness adjustment based on a representative brightness value of the input image data RGB, that is, a representative brightness value for input brightness values for each pixel, which are included in the input image data RGB.

The image data conversion circuit 240 may convert an input brightness value for each pixel into an output brightness value for each pixel by using a curve for brightness adjustment.

Figure 11:
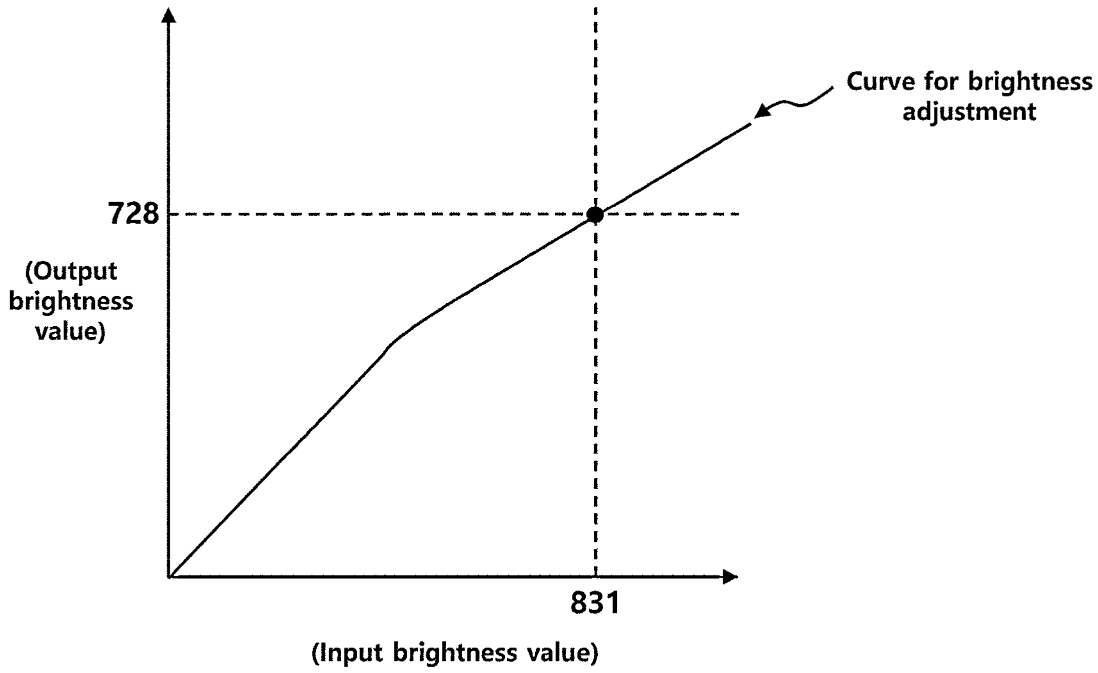
FIG. 11 is a diagram for describing a construction for generating a curve for brightness adjustment according to an embodiment.

For example, when any one pixel input brightness value included in the input image data RGB is 831, the image data conversion circuit 240 may convert 831, that is, any one pixel input brightness value, into 728, that is, an output brightness value by substituting a curve for brightness adjustment for 831 as in FIG. 11.

Likewise, the image data conversion circuit 240 that has converted input brightness values of all pixels included in the input image data RGB into output brightness values may transmit, to the image data transmission circuit 250, the output image data RGB' including the output brightness values for each pixel.

Furthermore, the image data transmission circuit 250 may transmit the output image data RGB' to the panel driving device 120.

In an embodiment, the calculation of the representative brightness value and the resulting generation of the curve for brightness adjustment may be processed in a frame unit of image data.

In other words, whenever the image data processing apparatus 110 receives the input image data RGB of a frame unit, the representative brightness value calculation circuit 210 may calculate the representative brightness value. Accordingly, the curve generation circuit 230 may generate a curve for brightness adjustment.

In this case, if a representative brightness value of a current frame is suddenly changed compared to a representative brightness value of a previous frame, a user who watches the display device 100 may feel a sense of difference because brightness of a screen is greatly changed.

In an embodiment, in order to solve such a problem, a dimming scheme capable of reducing a sudden change in the representative brightness value may be applied.

Hereinafter, detailed elements of the curve generation circuit 230 are described.

Figure 4:
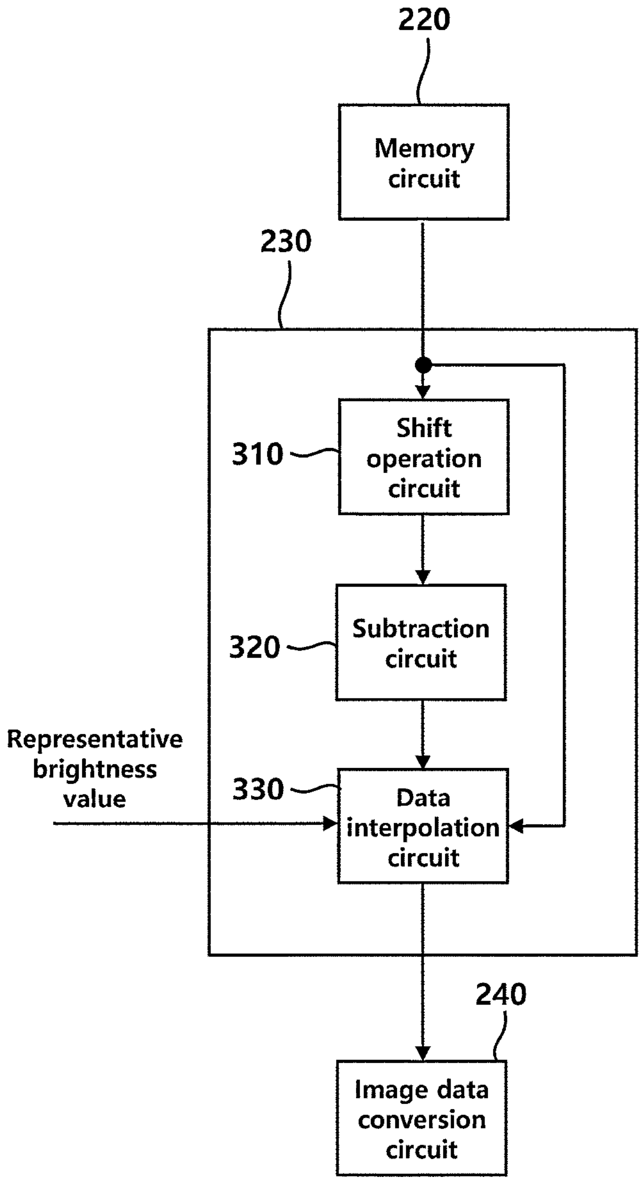
FIG. 4 is a construction diagram of a curve generation circuit according to an embodiment.

FIG. 4 is a construction diagram of the curve generation circuit 230 according to an embodiment.

Referring to FIG. 4, the curve generation circuit 230 may include a shift operation circuit 310, a subtraction circuit 320, and a data interpolation circuit 330.

The shift operation circuit 310 may calculate, through a shift operation, first to N-th power values, that is, power values of 2 having N set values as exponents.

For example, if the N set values include eight set values of a point 1 set value to a point 8 set value as in FIG. 5 and the point 8 set value is 5, the shift operation circuit 310 may calculate a binary number "00010000" corresponding to 32, that is, a five-power value of two, by shifting a binary number "00000001" to the left by 5.

The subtraction circuit 320 may calculate an N-th X axis point value by subtracting an N-th power value from the highest brightness value of a preset pixel, and may calculate an (N−1)-th X axis point value by subtracting an (N−1)-th power value from the N-th X axis point value.

In other words, when calculating N X axis point values, the subtraction circuit 320 may calculate the N X axis point values in order from a point value having the greatest brightness value to a point value having the smallest brightness value through a subtraction operation.

The data interpolation circuit 330 may match the N X axis point values and N first Y axis point values stored in the memory circuit 220, and may then calculate values that connect the N X axis point values through a data interpolation method. Accordingly, the data interpolation circuit 330 may generate a first reference curve, such as that in FIG. 9.

Furthermore, after matching the N X axis point values and the N second Y axis point values stored in the memory circuit 220, the data interpolation circuit 330 may calculate values that connect the N X axis point values through the data interpolation method. Accordingly, the data interpolation circuit 330 may generate a second reference curve, such as that in FIG. 10.

The data interpolation circuit 330 that has generated the first reference curve and the second reference curve as described above may generate a curve for brightness adjustment through a data interpolation method using a first representative brightness value designated for the first reference curve, a second representative brightness value designated for the second reference curve, and a representative brightness value. In this case, the first representative brightness value and the second representative brightness value may be stored in the memory circuit 220. The representative brightness value may be smaller than or equal to the first representative brightness value, and may be greater than or equal to the second representative brightness value.

The data interpolation circuit 330 may calculate N Y axis point values of the curve for brightness adjustment through the interpolation method equation (Equation 3). Furthermore, the data interpolation circuit 330 may generate a curve for brightness adjustment, such as that in FIG. 12, by also calculating values that connect N X axis point values matched (refer to the origin in FIG. 12) with the N Y axis point values through the data interpolation method.

If the representative brightness value calculation circuit 210 calculates a weighted average brightness value for input brightness values for each pixel and the memory circuit 220 stores a lookup table, such as that in FIG. 8, the data interpolation circuit 330 may extract, from the lookup table, a specific representative brightness grade according to a specific average brightness range versus a specific weighted average brightness range. In this case, the specific representative brightness range means a representative brightness range including a representative brightness value for input brightness values for each pixel. The specific weighted average brightness range means a weighted average brightness range including a weighted average brightness value for input brightness values for each pixel.

The data interpolation circuit 330 may also generate a curve for brightness adjustment by using the first reference curve, the second reference curve, and the specific representative brightness grade.

In other words, a first representative brightness grade may be designated for the first reference curve. A second representative brightness grade may be designated for the second reference curve. Furthermore, the data interpolation circuit 330 may generate a curve for brightness adjustment through a data interpolation method using the first representative brightness grade, the second representative brightness grade, and the specific representative brightness grade.

Figure 12:
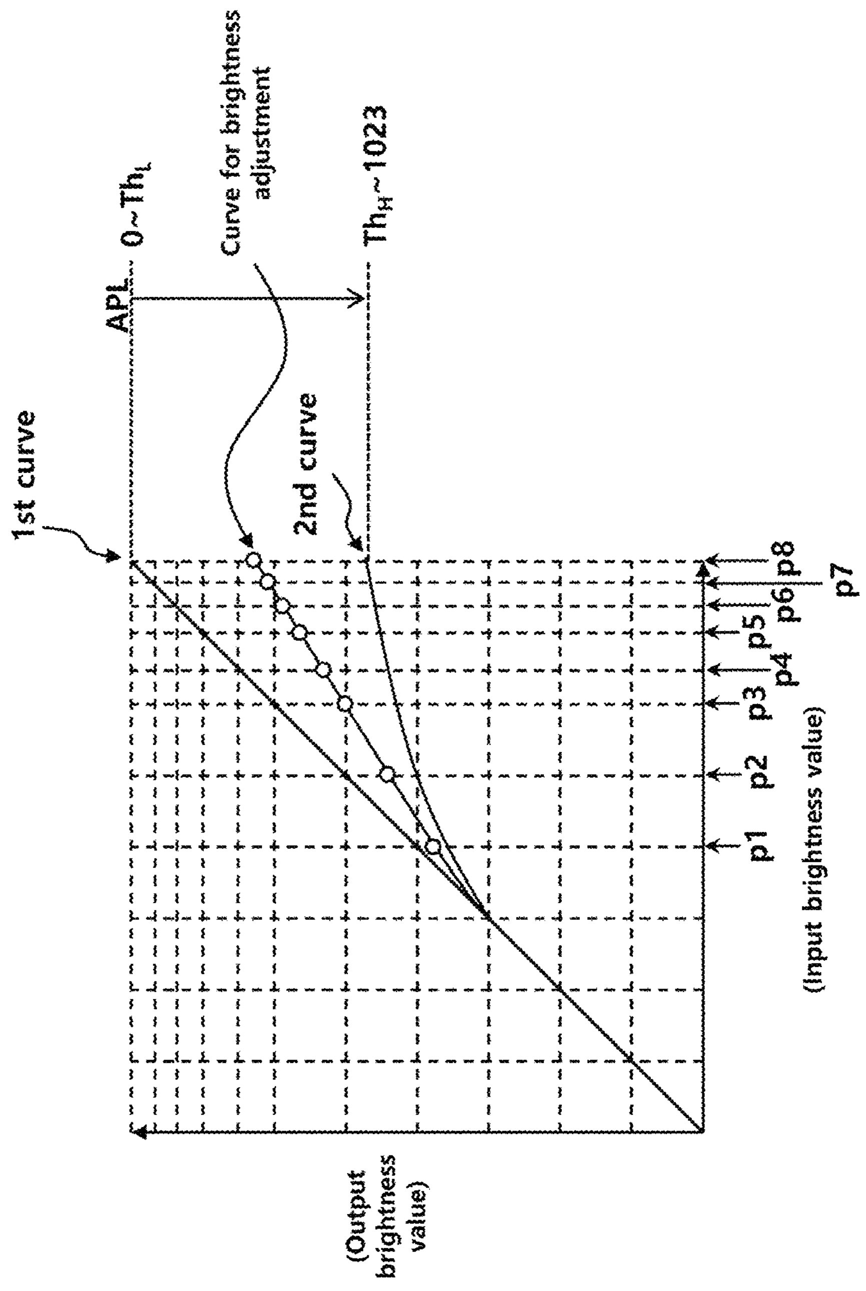
FIG. 12 is a diagram for describing a construction for generating a curve for brightness adjustment according to an embodiment.

FIG. 12 is a diagram for describing a construction for generating a curve for brightness adjustment according to an embodiment. Referring to FIG. 12, in an embodiment, the image data processing apparatus 110 may control the application of the ACL according to Equation 4.

$$\text{target Curve} = \begin{cases} \text{OFF}, & APL < Th_L \\ \text{MinCurve} - \dfrac{\text{MinCurve} - \text{MaxCurve}}{1024} \times \dfrac{1024}{Th_H - Th_L} \times (APL - Th_L), & Th_L \le APL < Th_H \\ \text{MaxCurve}, & APL \ge Th_H \end{cases} \quad \text{[Equation 4]}$$

Referring to Equation 4 and FIG. 12, in an embodiment, when the APL or the WAPL is smaller than the first threshold value ($Th_L$) (e.g., the APL is between 0 and the first threshold value), this corresponds to a case where a corresponding image is relatively dark. Accordingly, the image data conversion circuit 240 may not apply the ACL (ACL off). For example, when the APL or the WAPL is smaller than the first threshold value, the image data conversion circuit 240 may output an input brightness value for each pixel as an output brightness value for each pixel without any change, without adjusting the input brightness value for each pixel.

According to various embodiments, as a result of the comparison, when the APL or the WAPL is greater than the second threshold value ($Th_H$), this corresponds to a case where an image has set brightness or more. Accordingly, the image data conversion circuit 240 may control the ACL so that the ACL is applied based on a set maximum reference curve (Max Curve) for brightness adjustment. In an embodiment, if the ACL is controlled to be applied based on the set maximum reference curve (Max Curve) for brightness adjustment, it may be considered that the ACL has been applied (ACL on).

According to various embodiments, when the APL or the WAPL is greater than the first threshold value ($Th_L$) and smaller than the second threshold value ($Th_H$), as in the descriptions of FIGS. 4 to 11, the image data conversion circuit 240 may apply the ACL to an input image data based on a curve for brightness adjustment, which is generated by the curve generation circuit 230.

Hereinafter, a process of processing, by the image data processing apparatus 110, image data is described.

Figure 13:
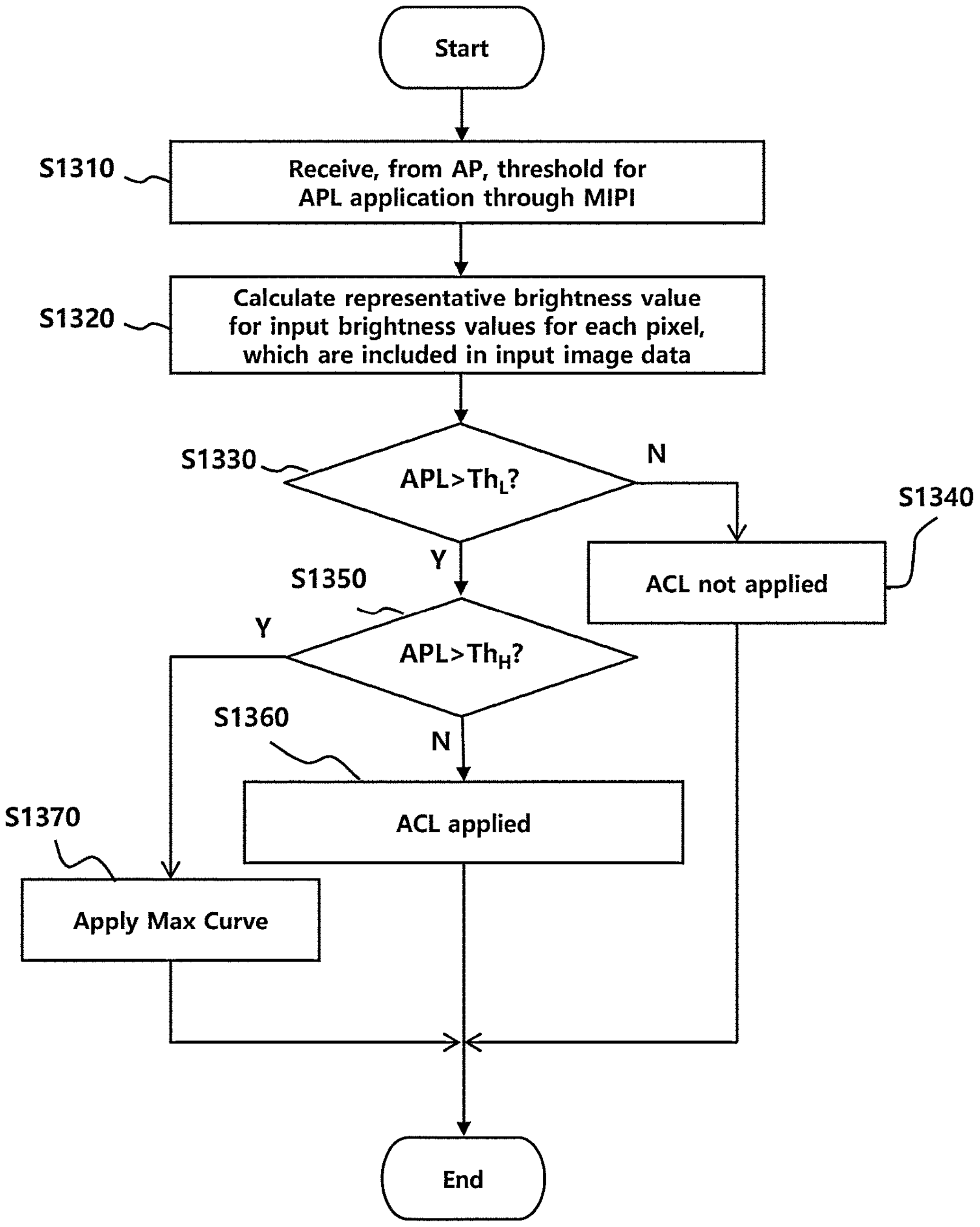
FIG. 13 is a flowchart illustrating a process of processing image data in the image data processing apparatus according to an embodiment.

FIG. 13 is a flowchart illustrating a process of processing image data in the image data processing apparatus according to an embodiment.

Referring to FIG. 13, the image data processing apparatus 110 (e.g., the display processing apparatus) may receive, from the AP 10, a threshold value (a first threshold value or a second threshold value) for an APL application through the MIPI (S1310).

As described above, the image data processing apparatus 110 may calculate a representative brightness value (e.g., an APL or a WAPL) for input brightness values for each pixel, which are included in input image data (S1320).

The image data processing apparatus 110 may compare the representative brightness value with the first threshold value. When the APL or the WAPL is smaller than the first threshold value ($Th_L$) (e.g., when the APL is between 0 and the first threshold value) (S1330-N) as a result of the comparison, this corresponds to a case where a corresponding image is relatively dark, and thus the image data conversion circuit 240 may not apply the ACL (ACL off) (S1340).

According to various embodiments, when the APL or the WAPL is greater than the first threshold value ($Th_L$) as a result of the comparison, the image data processing apparatus 110 may compare the representative brightness value with the second threshold value. When the APL or the WAPL is greater than the second threshold value ($Th_H$) (S1350-Y), this corresponds to a case where the image has set brightness or more, and thus the image data conversion circuit 240 may control the ACL so that the ACL is applied based on a set maximum reference curve (Max Curve) for brightness adjustment (S1370). In an embodiment, if the ACL is controlled to be applied based on the set maximum reference curve (Max Curve) for brightness adjustment, it may be considered that the ACL is applied (ACL on).

According to various embodiments, when the APL or the WAPL is greater than the first threshold value ($Th_L$) and is smaller than or equal to the second threshold value ($Th_H$) (S1350-N), as in the description of FIGS. 4 to 11, the image data conversion circuit 240 may apply the ACL to the input image data based on a curve for brightness adjustment which is generated by the curve generation circuit 230 (S1360).

Hereinafter, a detailed operation of applying the ACL in step S1360 of FIG. 13 is described with reference to FIG. 14.

Figure 14:
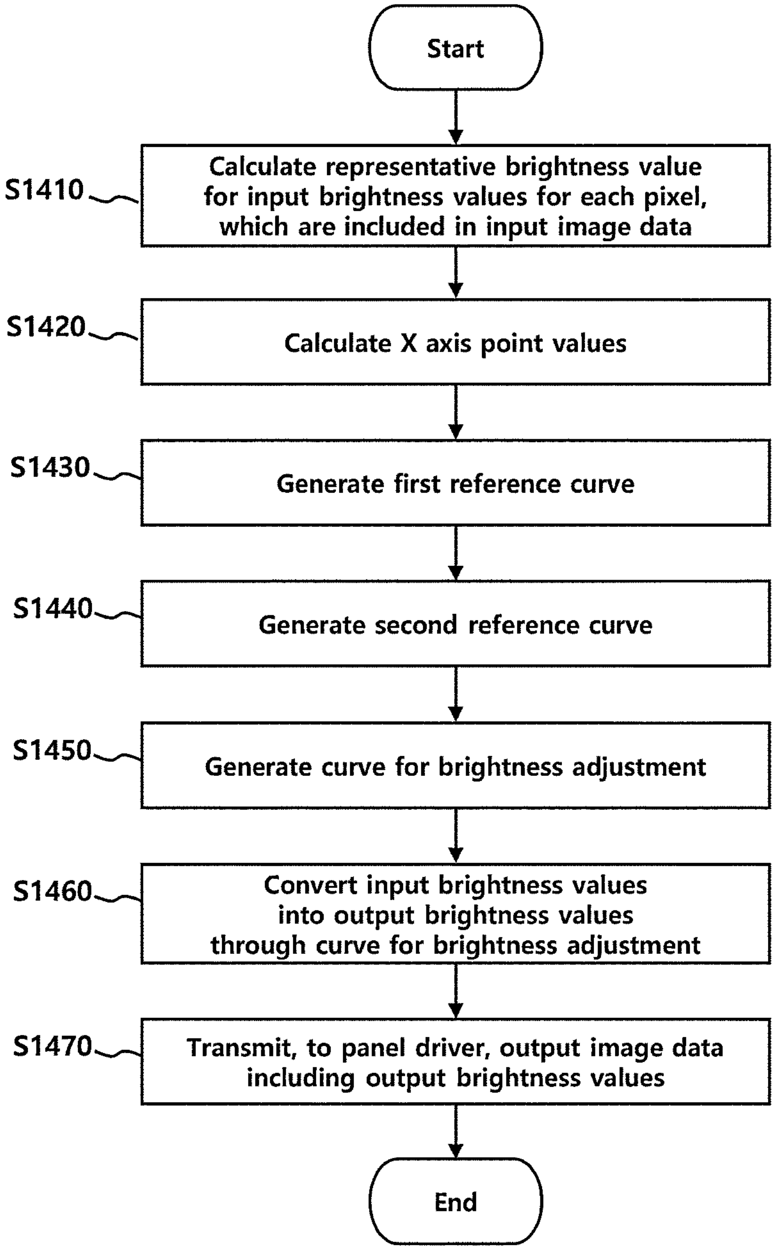
FIG. 14 is a flowchart illustrating a process of processing image data in the image data processing apparatus according to an embodiment.

FIG. 14 is a flowchart illustrating a process of processing image data in the image data processing apparatus according to an embodiment.

Referring to FIG. 14, after receiving input image data RGB from a host device, the image data processing apparatus 110 (e.g., the display processing apparatus) may calculate a representative brightness value for input brightness values for each pixel, which are included in the input image data RGB (S1410). In this case, the representative brightness value may be called an average picture level (APL). The input brightness values for each pixel may include a red (R) grayscale value that is a grayscale value of an R subpixel of each pixel, a green (G) grayscale value that is a grayscale value of a G subpixel of each pixel, and a blue (B) grayscale value that is a grayscale value of a B subpixel of each pixel. The image data processing apparatus 110 may calculate the representative brightness value through Equation 1 and Equation 2.

The image data processing apparatus 110 that has calculated the representative brightness value as described above may calculate N X axis point values using N set values that are previously stored (S1420). In this case, the image data processing apparatus 110 calculates the N X axis point values through a shift operation and a subtraction operation using the N set values, but may preferentially calculate an N-th X axis point value.

Thereafter, the image data processing apparatus 110 may match the N X axis point values and N first Y axis point values that have been previously stored, and may generate a first reference curve by calculating values that connect the N X axis point values through a data interpolation method (S1430).

The image data processing apparatus 110 may match the N X axis point values and N second Y axis point values that have been previously stored, and may generate a second reference curve by calculating values that connect the N X axis point values through the data interpolation method (S1440). In this case, the sequence in which the first reference curve and the second reference curve are generated may be randomly determined by a designer who designs the image data processing apparatus 110.

Thereafter, the image data processing apparatus 110 may generate a curve for brightness adjustment through a data interpolation method using a first representative brightness value designated for the first reference curve, a second representative brightness value designated for the second reference curve, and the representative brightness value (S1450). In this case, the representative brightness value may be smaller than or equal to the first representative brightness value, and may be greater than or equal to the second representative brightness value.

The image data processing apparatus 110 may convert the input brightness values for each pixel into output brightness values for each pixel by using the curve for brightness adjustment, and may transmit, to the panel driving device 120, output image data RGB' including the output brightness values for each pixel (S1460, S1470).

In step S1410, the image data processing apparatus 110 may further calculate a weighted average brightness value for the input brightness values for each pixel.

In such a case, the image data processing apparatus 110 may further store a lookup table, such as that in FIG. 8. After step S1440, the image data processing apparatus 110 may extract, from the lookup table, a specific representative brightness grade according to a specific average brightness range including the representative brightness value versus a specific weighted average brightness range including the weighted average brightness value.

Furthermore, the image data processing apparatus 110 may also generate a curve for brightness adjustment by using the first reference curve, the second reference curve, and the specific representative brightness grade.

As described above, in an embodiment, the image data processing apparatus 110 generates a curve for brightness adjustment by properly adjusting the curve based on a representative brightness value of an image scene, and adjusts brightness of each pixel corresponding to the image scene through the curve for brightness adjustment. Accordingly, a phenomenon in which picture quality is degraded, which occurs due to uniform brightness adjustment conventionally, can be solved.

Furthermore, a circuit that constitutes the image data processing apparatus 110 can be simplified because the image data processing apparatus 110 generates a curve for brightness adjustment through a shift operation, a subtraction operation, and a data interpolation method.

What is claimed is:

1. A display processing apparatus comprising:

a memory circuit configured to store one or more threshold values related to adjustments of brightness of respective pixels;

a representative brightness value calculation circuit configured to calculate a representative brightness value for input brightness values for the respective pixels, wherein the input brightness values for the respective pixels are included in image data, and further wherein the representative brightness value corresponds to an average picture level for the input brightness values for the respective pixels; and an image data conversion circuit configured to convert the input brightness values for the respective pixels into output brightness values for the respective pixels based on information corresponding to a reference curve for brightness adjustment when the representative brightness value is greater than a first threshold value stored in the memory circuit, wherein the reference curve provides a mapping between an input brightness value and an output brightness value, said one or more threshold values related to the adjustments of the brightness of the respective pixels are received through a mobile industry process interface (MIPI) communication, and said one or more threshold values related to the adjustments of the brightness of the respective pixels are stored in respective registers of an application processor, having addresses corresponding to the respective threshold values.

2. The display processing apparatus of claim 1, wherein said one or more threshold values related to the adjustments of the brightness of the respective pixels are set based on grayscale values.

3. The display processing apparatus of claim 1, further comprising a curve generation circuit configured to generate the reference curve for brightness adjustment, wherein the curve generation circuit is configured to:

calculate N X axis point values by using N set values, wherein N is a natural number of 2 or more, generate a first reference curve by using N first Y axis point values and the X axis point values, generate a second reference curve by using N second Y axis point values and the X axis point values, generate the curve for brightness adjustment by using the first reference curve, the second reference curve, and the representative brightness value, and convert the input brightness values for the respective pixels into the output brightness values for the respective pixels by using the curve for brightness adjustment.

4. The display processing apparatus of claim 3, further comprising an image data transmission circuit configured to transmit, to a panel driving device, output image data comprising the output brightness values.

5. The display processing apparatus of claim 4, wherein the input brightness values for the respective pixels, the X axis point values, the first Y axis point values, the second Y axis point values, and the output brightness values for the respective pixels are grayscale values.

6. The display processing apparatus of claim 3, wherein:

an X axis coordinate value of the curve for brightness adjustment comprises the input brightness value for each pixel, and a Y axis coordinate value of the curve for brightness adjustment comprises the output brightness value for each pixel.

7. The display processing apparatus of claim 3, wherein:

the first reference curve is generated by matching the X axis point values and the first Y axis point values and calculating values between the X axis point values through a data interpolation method, and the second reference curve is generated by matching the X axis point values and the second Y axis point values and calculating values between the X axis point values through a data interpolation method.

8. The display processing apparatus of claim 3, wherein the representative brightness value is smaller than or equal to a first representative brightness value designated in the first reference curve and is greater than or equal to a second representative brightness value designated in the second reference curve.

9. A method of processing image data in a display processing apparatus, the method comprising:

receiving one or more threshold values related to adjustments of brightness of respective pixels;

calculating a representative brightness value for input brightness values for the respective pixels, wherein the input brightness values for the respective pixels are included in image data, and further wherein the representative brightness value corresponds to an average picture level for the input brightness values for the respective pixels; and converting the input brightness values for the respective pixels into output brightness values for the respective pixels based on information corresponding to a reference curve for brightness adjustment when the representative brightness value is greater than a first threshold value among said one or more threshold values, wherein the reference curve provides a mapping between an input brightness value and an output brightness value, said one or more threshold values related to the adjustments of the brightness of the respective pixels are received through communication using a mobile industry process interface (MIPI), and said one or more threshold values related to the adjustments of the brightness of the respective pixels are stored in respective registers of an application processor, having addresses corresponding to the respective threshold values.

10. The method of claim 9, wherein said one or more threshold values related to the adjustments of the brightness of the respective pixels are set based on grayscale values.

11. The method of claim 9, further comprising generating a reference curve for brightness adjustment, wherein generating the reference curve for brightness adjustment comprises:

calculating N X axis point values by using N set values, wherein N is a natural number of 2 or more, generating a first reference curve by using N first Y axis point values and the X axis point values and generating a second reference curve by using N second Y axis point values and the X axis point values, generating the curve for brightness adjustment by using the first reference curve, the second reference curve, and the representative brightness value, and converting the input brightness values for the respective pixels into the output brightness values for the respective pixels by using the curve for brightness adjustment.

12. The method of claim 11, wherein the input brightness values for the respective pixels, the X axis point values, the first Y axis point values, the second Y axis point values, and the output brightness values for the respective pixels are grayscale values.

13. The method of claim 11, wherein:

an X axis coordinate value of the curve for brightness adjustment comprises the input brightness value for each pixel, and a Y axis coordinate value of the curve for brightness adjustment comprises the output brightness value for each pixel.

14. The method of claim 11, wherein:

generating the first reference curve comprises generating the first reference curve by matching the X axis point values and the first Y axis point values and calculating values between the X axis point values through a data interpolation method; and generating the second reference curve comprises generating the second reference curve by matching the X axis point values and the second Y axis point values and calculating values between the X axis point values through a data interpolation method.

15. The method of claim 11, wherein the representative brightness value is smaller than or equal to a first representative brightness value designated in the first reference curve and is greater than or equal to a second representative brightness value designated in the second reference curve.

16. A display processing apparatus comprising:

a memory circuit configured to store one or more threshold values related to adjustments of brightness of respective pixels;

a representative brightness value calculation circuit configured to calculate a representative brightness value for input brightness values for the respective pixels, wherein the input brightness values for the respective pixels are included in image data, and further wherein the representative brightness value corresponds to an average picture level for the input brightness values for the respective pixels; and an image data conversion circuit configured to convert the input brightness values for the respective pixels into output brightness values for the respective pixels based on information corresponding to a reference curve for brightness adjustment when the representative brightness value is greater than a first threshold value stored in the memory circuit, wherein the reference curve provides a mapping between an input brightness value and an output brightness value, and the input brightness values for the respective pixels are converted into the output brightness values based on the information corresponding to the reference curve only when the representative brightness value is greater than the first threshold value.

* * * * *